United States Patent
Koudai et al.

(10) Patent No.: US 12,214,831 B2
(45) Date of Patent: Feb. 4, 2025

(54) TURNING CONTROL DEVICE

(71) Applicants: JTEKT CORPORATION, Kariya (JP); TOYOTA JIDOSHA KABUSHIKI KAISHA, Toyota (JP)

(72) Inventors: Takashi Koudai, Okazaki (JP); Yuji Fujita, Okazaki (JP); Yugo Nagashima, Anjo (JP); Kazuma Hasegawa, Anjo (JP); Yuuta Kajisawa, Okazaki (JP); Masaharu Yamashita, Toyota (JP); Yosuke Yamashita, Nagoya (JP); Kazuaki Iida, Toyota (JP); Shintaro Takayama, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 18/158,591

(22) Filed: Jan. 24, 2023

(65) Prior Publication Data
US 2023/0303159 A1  Sep. 28, 2023

(30) Foreign Application Priority Data

Jan. 28, 2022  (JP) ................... 2022-012044

(51) Int. Cl.
*B62D 5/04* (2006.01)

(52) U.S. Cl.
CPC ......... *B62D 5/0481* (2013.01); *B62D 5/0457* (2013.01)

(58) Field of Classification Search
None
See application file for complete search history.

(56) References Cited

U.S. PATENT DOCUMENTS

| | | | | |
|---|---|---|---|---|
| 7,822,516 B2 * | 10/2010 | Yanaka | ................. | B62D 5/003 |
| | | | | 701/33.6 |
| 7,828,112 B2 * | 11/2010 | Kezobo | ............... | B62D 5/0481 |
| | | | | 180/443 |

(Continued)

FOREIGN PATENT DOCUMENTS

| | | | | | |
|---|---|---|---|---|---|
| CN | 101421148 A | * | 4/2009 | .......... | B62D 5/0463 |
| CN | 101421148 B | * | 6/2010 | .......... | B62D 5/0463 |

(Continued)

OTHER PUBLICATIONS

Sep. 5, 2023 extended Search Report issued in European Patent Application No. 23153258.1.

*Primary Examiner* — Kevin R Steckbauer
(74) *Attorney, Agent, or Firm* — Oliff PLC

(57) ABSTRACT

A turning control device includes a precursor detection circuit configured to detect a precursor of an abnormality by which a smooth operation of a turning device is impaired. The precursor detection circuit is configured to start measurement of a total running time of a vehicle when the precursor is detected, and is configured to execute a process of reporting the precursor, based on the measured total running time. The precursor detection circuit is configured to perform the measurement of the total running time regardless of whether the precursor is detected again, when a vehicle electric power source is switched off and then is switched on again after the precursor is detected once.

4 Claims, 4 Drawing Sheets

(56) References Cited

U.S. PATENT DOCUMENTS

| | | | |
|---|---|---|---|
| 8,504,247 B2 * | 8/2013 | Yamashita | B62D 5/0481 |
| | | | 180/443 |
| 9,065,375 B2 * | 6/2015 | Yanai | B62D 5/0487 |
| 11,299,199 B2 * | 4/2022 | Lee | B62D 5/0481 |
| 2004/0243287 A1 * | 12/2004 | Yanaka | B60W 50/02 |
| | | | 701/33.6 |
| 2006/0113138 A1 * | 6/2006 | Maron | B60R 16/0232 |
| | | | 180/271 |
| 2006/0282565 A1 * | 12/2006 | Kumaido | B62D 5/0493 |
| | | | 710/41 |
| 2009/0084616 A1 * | 4/2009 | Kezobo | B62D 5/0481 |
| | | | 180/6.44 |
| 2010/0044146 A1 * | 2/2010 | Kasai | B62D 5/0481 |
| | | | 180/446 |
| 2011/0066331 A1 * | 3/2011 | Yamashita | B62D 5/0481 |
| | | | 701/42 |
| 2013/0320905 A1 * | 12/2013 | Uryu | H02K 11/20 |
| | | | 318/490 |
| 2013/0342148 A1 * | 12/2013 | Yanai | B62D 5/0487 |
| | | | 318/472 |
| 2019/0061810 A1 * | 2/2019 | Lee | B62D 5/0481 |
| 2019/0111968 A1 * | 4/2019 | Skellenger | B62D 6/008 |
| 2023/0303159 A1 * | 9/2023 | Koudai | B62D 5/0457 |
| 2023/0356731 A1 * | 11/2023 | Chen | B60W 50/023 |

FOREIGN PATENT DOCUMENTS

| | | | | |
|---|---|---|---|---|
| CN | 103442967 B | * | 11/2015 | B62D 5/0484 |
| CN | 107499374 A | * | 12/2017 | B62D 5/04 |
| CN | 108367776 A | * | 8/2018 | B62D 5/0481 |
| CN | 107499374 B | * | 4/2019 | B62D 5/04 |
| CN | 111196280 A | * | 5/2020 | B60W 50/02 |
| CN | 111196280 B | * | 3/2023 | B60W 50/02 |
| DE | 102015122253 A1 | * | 6/2017 | B62D 5/0481 |
| DE | 102018213624 A1 | * | 2/2019 | B62D 5/0463 |
| EP | 4039563 A1 | * | 8/2022 | B62D 5/0424 |
| EP | 4116779 A1 | * | 1/2023 | B60R 16/0231 |
| EP | 4253195 A1 | * | 10/2023 | B62D 5/0481 |
| JP | 2005-041273 A | | 2/2005 | |
| JP | 2008-105604 A | | 5/2008 | |
| JP | 4155112 B2 | * | 9/2008 | B60W 50/02 |
| JP | 2011036119 A | * | 2/2011 | |
| JP | 5532294 B2 | * | 6/2014 | |
| WO | WO-2012124098 A1 | * | 9/2012 | B62D 5/0484 |

* cited by examiner

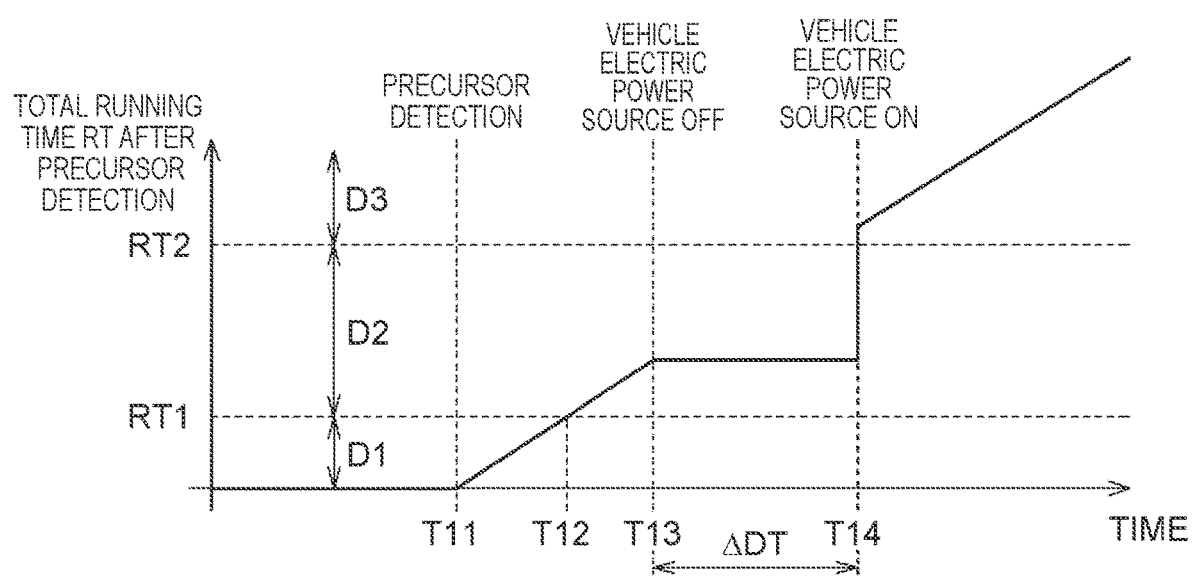

TURNING CONTROL DEVICE

CROSS-REFERENCE TO RELATED APPLICATION

This application claims priority to Japanese Patent Application No. 2022-012044 filed on Jan. 28, 2022, incorporated herein by reference in its entirety.

BACKGROUND

1. Technical Field

The present disclosure relates to a turning control device.

2. Description of Related Art

A turning device in Japanese Unexamined Patent Application Publication No. 2008-105604 (JP 2008-105604 A) includes a transmission mechanism that transmits rotation of a motor to a turning shaft. The transmission mechanism includes a driving pulley, a driven pulley and a belt. The driving pulley is provided at an output shaft of the motor. The driven pulley is provided at a ball nut screwed to the turning shaft. The belt is wound around the driving pulley and the driven pulley.

The turning device in JP 2008-105604 A includes a control device. The control device evaluates the slip ratio of the belt from the rotation speed of the motor and the steering speed of a steering wheel. When the slip ratio is exceeding a threshold, the control device determines that the slippage of the belt has occurred. The control device informs a driver of a vehicle that the slippage of the belt has occurred, through an in-vehicle abnormality report unit.

SUMMARY

When the vehicle continues to be used after the slippage of the belt is detected, there is a risk that it becomes difficult for the turning device to smoothly operate as time passes. However, the vehicle can run at the time point when the slippage of the belt is detected. Therefore, there is a risk that the driver continues to use the vehicle even after the slippage of the belt is reported to the driver. Accordingly, it is desirable to more appropriately report, to the driver of the vehicle, a precursor of an abnormality by which a smooth operation of the turning device is impaired.

An aspect of the present disclosure is a turning control device. The turning control device controls a turning device that turns a turning wheel of a vehicle. The turning control device includes a precursor detection circuit configured to detect a precursor of an abnormality by which a smooth operation of the turning device is impaired. The precursor detection circuit is configured to start measurement of a total running time of the vehicle when the precursor is detected, and is configured to execute a process of reporting the precursor, based on the measured total running time. The precursor detection circuit is configured to perform the measurement of the total running time regardless of whether the precursor is detected again, when a vehicle electric power source is switched off and then is switched on again after the precursor is detected once.

With the above configuration, when the vehicle electric power source is switched off and then is switched on again after the precursor of the abnormality by which the smooth operation of the turning device is impaired is detected once, the precursor detection circuit performs the measurement of the total running time of the vehicle, even when the precursor is not detected again. Therefore, it is possible to appropriately report the precursor depending on the total running time of the vehicle.

In the turning control device, the precursor may be a precursor that occurs due to a cumulative or irreversible event. With the above configuration, because of the precursor that occurs due to a cumulative or irreversible event, it is possible to appropriately detect the precursor based on the total running time of the vehicle.

In the turning control device, the precursor detection circuit may be configured to store the total running time when the vehicle electric power source is switched off. The precursor detection circuit may be configured to read the total running time stored at a timing when the vehicle electric power source is switched off, when the vehicle electric power source is switched on again, and is configured to restart the measurement of the total running time, using the read total running time as an initial value.

With the above configuration, the precursor detection circuit can appropriately report the precursor to the driver, depending on the total running time of the vehicle from the time point of the first detection of the precursor.

In the turning control device, the precursor detection circuit may be configured to increase the initial value depending on a period during which the vehicle electric power source is in an off-state.

With the above configuration, it is possible to more quickly report the precursor in consideration of the deterioration in the condition of the turning device in the period during which the vehicle electric power source is in the off-state.

In the turning control device, the turning device may include a turning shaft that turns the turning wheel, a turning motor that generates dynamic force for turning the turning wheel, and a transmission mechanism that transmits the dynamic force of the turning motor to the turning shaft. The abnormality may include rust of the transmission mechanism. The precursor detection circuit may be configured to increase the initial value when the period during which the vehicle electric power source is in the off-state is longer than a time determination threshold, the time determination threshold being set using, as a standard, a period during which the rust of the transmission mechanism is likely to progress.

With the above configuration, it is possible to more quickly report the precursor in consideration of the progression of the rust of the transmission mechanism in the period during which the vehicle electric power source is in the off-state.

In the turning control device, the precursor detection circuit may be configured to raise a report level for the precursor depending on the total running time from a time point of a first detection of the precursor.

With the above configuration, it is possible to more appropriately report, to the driver, the precursor of the abnormality by which the smooth operation of the turning device is impaired.

With the turning control device in the aspect of the present disclosure, it is possible to more appropriately report the precursor of the abnormality by which the smooth operation of the turning device is impaired.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 6 is a graph showing a precursor report pattern in a second embodiment.

DETAILED DESCRIPTION OF EMBODIMENTS

First Embodiment

A first embodiment in which a turning control device is embodied as a steer-by-wire type steering device will be described below.

Figure 1:
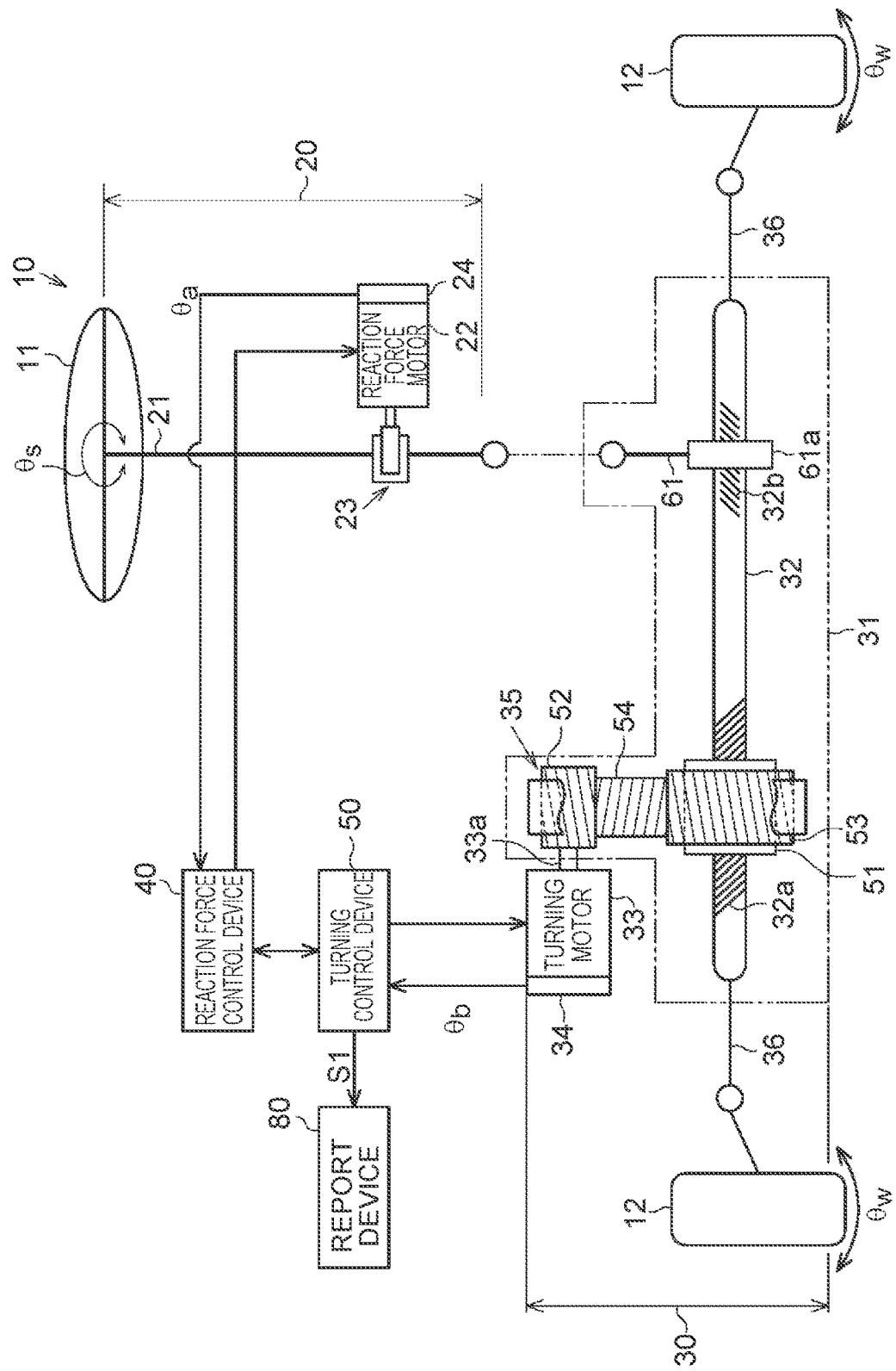
FIG. 1 is a configuration diagram of a first embodiment of a steering device.

As shown in FIG. 1, a steering device 10 of a vehicle includes a reaction force unit 20, a turning unit 30, a reaction force control device 40 and a turning control device 50. The reaction force unit 20 is a component that gives steering reaction force to a steering wheel 11 of a vehicle. The steering reaction force is a torque that act in the opposite direction of the operation direction of the steering wheel 11 by a driver. The turning unit 30 is a component that turns turning wheels 12 of the vehicle. The turning unit 30 constitutes a turning device of the vehicle. The reaction force control device 40 controls the operation of the reaction force unit 20. The turning control device 50 controls the operation of the turning unit 30.

Reaction Force Unit

The reaction force unit 20 includes a steering shaft 21 coupled with the steering wheel 11, a reaction force motor 22, a speed reduction mechanism 23 and a rotation angle sensor 24.

The reaction force motor 22 is a generation source of the steering reaction force. For example, the reaction force motor 22 is a three-phase brushless motor. The reaction force motor 22 is coupled with the steering shaft 21 through the speed reduction mechanism 23. The torque generated by the reaction force motor 22 is given to the steering shaft 21 as the steering reaction force.

The rotation angle sensor 24 is provided on the reaction force motor 22. The rotation angle sensor 24 detects a rotation angle $θ_a$ of the reaction force motor 22. The reaction force control device 40 executes a reaction force control. The reaction force control is a control for generating a steering reaction force corresponding to a steering angle $θ_s$ through a drive control of the reaction force motor 22. The reaction force control device 40 computes the steering angle $θ_s$ based on the rotation angle $θ_a$ detected by the rotation angle sensor 24. The steering angle $θ_s$ is the rotation angle of the steering shaft 21. The reaction force control device 40 computes a target steering reaction force based on the steering angle $θ_s$. The reaction force control device 40 controls the supply of electricity to the reaction force motor 22, depending on the target steering reaction force.

Turning Unit

The turning unit 30 includes a housing 31, a turning shaft 32, a turning motor 33, a rotation angle sensor 34 and a transmission mechanism 35.

The housing 31 is foxed to an unillustrated vehicle body. The turning shaft 32 is contained in the interior of the housing 31. The turning shaft 32 extends in the right-left direction (the right-left direction in FIG. 1) of the vehicle body. The turning wheels 12 are coupled with both ends of the turning shaft 32 through tie-rods 36, respectively. The turning shaft 32 moves in the axis direction of the turning shaft 32, and thereby, a turning angle $θ_w$ of the turning wheels 12 is altered.

For example, the turning motor 33 is a three-phase brushless motor. The turning motor 33 is a generation source of the turning force. The turning force is a dynamic force for turning the turning wheels 12. The turning motor 33 is fixed to the exterior of the housing 31. An output shaft 33a of the turning motor 33 extends parallel to the turning shaft 32. The output shaft 33a is coupled with the turning shaft 32 through the transmission mechanism 35. The torque generated by the turning motor 33 is given to the turning shaft 32 as the turning force.

The rotation angle sensor 34 is provided on the turning motor 33. The rotation angle sensor 34 detects a rotation angle $θ_b$ of the turning motor 33. The rotation angle $θ_b$ of the turning motor 33 is a value that reflects the position of the turning shaft 32 in the axis direction of the turning shaft 32 and the turning angle $θ_w$ of the turning wheels 12.

The transmission mechanism 35 includes a ball nut 51, a toothed driving pulley 52, a toothed driven pulley 53, and a toothed endless belt 54. The ball nut 51 is screwed to a ball screw portion 32a of the turning shaft 32 through a plurality of unillustrated balls. The ball screw portion 32a is provided over a predetermined range at a position closer to a first end portion (a left end portion in FIG. 1) of the turning shaft 32. The driving pulley 52 is fixed to the output shaft 33a of the turning motor 33. The driven pulley 53 is fixed so as to be fit to an outer circumferential surface of the ball nut 51. The belt 54 is wound around the driving pulley 52 and the driven pulley 53. The rotation of the turning motor 33 is transmitted to the ball nut 51 through the driving pulley 52, the belt 54 and the driven pulley 53. With the rotation of the ball nut 51, the turning shaft 32 moves in the axis direction of the turning shaft 32.

The turning control device 50 executes a turning control. The turning control is a control for turning the turning wheels 12 depending on the steering state of the steering wheel 11, through the drive control of the turning motor 33. The turning control device 50 controls the supply of electricity to the turning motor 33, depending on the steering angle $θ_s$ computed by the reaction force control device 40.

The turning unit 30 includes a pinion shaft 61. The pinion shaft 61 is provided so as to cross the turning shaft 32. Pinion teeth 61a of the pinion shaft 61 engage with rack teeth 32b of the turning shaft 32. The rack teeth 32b are provided over a predetermined range at a position closer to a second end portion (a right end portion in FIG. 1) of the turning shaft 32.

The pinion shaft 61 is provided for supporting the turning shaft 32 in the interior of the housing 31 in cooperation with the transmission mechanism 35. That is, the turning shaft 32 is supported by an unillustrated support mechanism provided in the turning unit 30, so as to be capable of moving in the axis direction, and is pressed to the pinion shaft 61. Thereby, the turning shaft 32 is supported in the interior of the housing 31. Further, the rotation of the turning shaft 32 is restricted.

Another support mechanism that supports the turning shaft 32 in the housing 31 may be provided without using the pinion shaft 61. In this case, a configuration in which the pinion shaft 61 is excluded can be employed as the turning unit 30.

Turning Control Device

Next, the turning control device 50 will be described in detail. The turning control device 50 includes a processing circuit that has one of three configurations A1, A2 and A3 described below.

A1. One or more processors that operate in accordance with computer software programs. Each processor includes a central processing unit (CPU) and a memory.

A2. One or more dedicated hardware circuits such as application specific integrated circuits (ASICs) that execute at least some processes of various processes. Each ASIC includes a CPU and a memory.

A3. Hardware circuits in which the configuration A1 and the configuration A2 are combined.

The memory is a medium that can be read by a computer (a CPU in the embodiment), and stores programs in which processes or instructions to the computer are written. The memory includes a random access memory (RAM) and a read only memory (ROM). The CPU executes various controls by executing the programs stored in the memory with a decided computation period.

Figure 2:
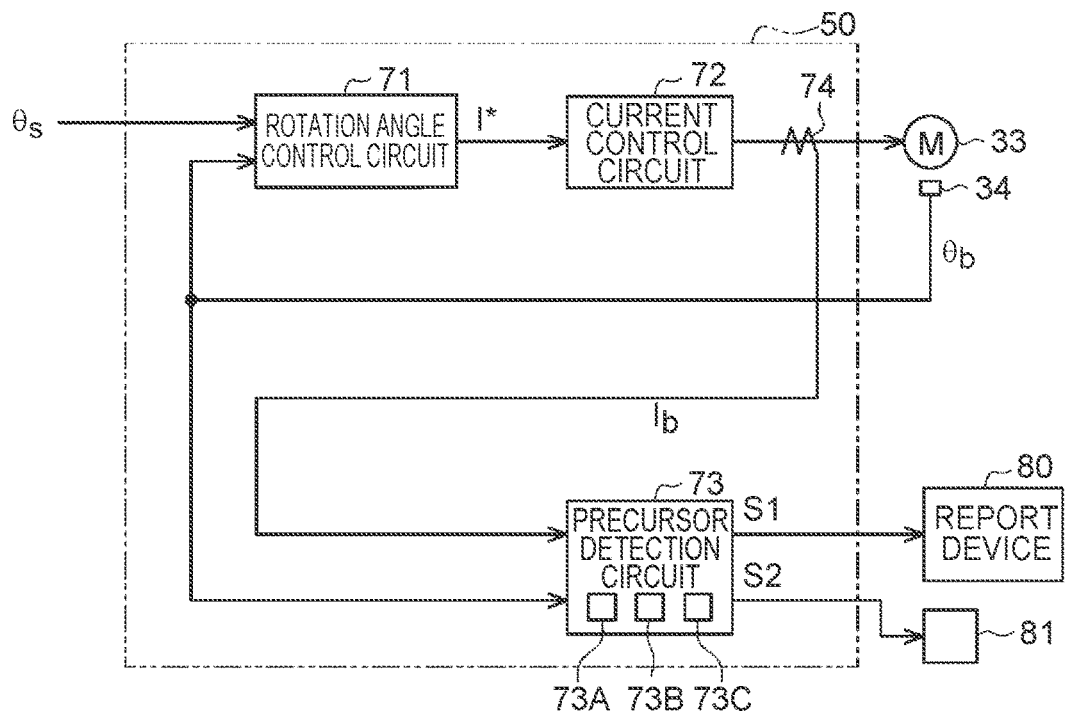
FIG. 2 is a block diagram of a control device in the first embodiment.

As shown in FIG. 2, the turning control device 50 includes a rotation angle control circuit 71, a current control circuit 72 and a precursor detection circuit 73. The rotation angle control circuit 71 takes the rotation angle $\theta_b$ of the turning motor 33 that is detected by the rotation angle sensor 34. Further, the rotation angle control circuit 71 computes a target rotation angle of the motor 15, based on the steering angle $\theta_s$ that is computed by the reaction force control device 40. The rotation angle control circuit 71 evaluates the difference between the target rotation angle of the turning motor 33 and the rotation angle $\theta_b$ of the turning motor 33 that is detected by the rotation angle sensor 34 for the turning motor 33, and computes a current command value I* for the turning motor 33, such that the difference is eliminated.

The current control circuit 72 supplies the electric power corresponding to the current command value I* that is computed by the rotation angle control circuit 71, to the turning motor 33. Thereby, the turning motor 33 generates a torque corresponding to the current command value I*.

The precursor detection circuit 73 detects a precursor of an abnormality by which a smooth operation of the transmission mechanism 35 is impaired, before the generation of the abnormality by which the smooth operation of the transmission mechanism 35 is impaired. When the precursor is detected, the precursor detection circuit 73 reports the precursor to the driver through a report device 80 that is provided in a vehicle cabin. The precursor detection circuit 73 generates a command signal S1 for the report device 80. Thee command signal S1 is an instruction for causing the report device 80 to execute a decided report operation. The report device 80 performs the report operation based on the command signal S1. For example, the report device 80 includes an indication lamp, a display, a buzzer and a speaker that are provided in the vehicle cabin. For example, the report operation includes lighting of the indication lamp, warning displaying by the display, and whistling of the buzzer.

Event as Precursor of Abnormality

For example, the precursor detection circuit 73 detects at least one event of three events B1 to B3 described below, as the precursor of the abnormality by which the smooth operation of the transmission mechanism 35 is impaired.

B1. The movement amount of the turning shaft 32 per unit rotation angle of the turning motor 33 becomes smaller than a precursor determination threshold.

B2. The damage amount accumulated in the transmission mechanism 35 reaches a precursor determination threshold.

B3. The torque gradient of the turning motor 33 reaches a precursor determination threshold.

Event B1

For example, the event B1 occurs due to the slack or abrasion of the belt 54. The slack or abrasion of the belt 54 is a cumulative or irreversible event. As for the slack or abrasion of the belt 54, basically, the condition irreversibly deteriorates, and does not improve. When the vehicle continues to be used, there is a risk that a crack is generated on the belt 54 and then the belt 54 gets torn. Therefore, it can be said that the event B1 is the precursor of the abnormality by which the smooth operation of the transmission mechanism 35 is impaired.

For example, the precursor detection circuit 73 computes the movement amount of the turning shaft 32, based on the rotation angle $\theta_b$ of the turning motor 33. The precursor detection circuit 73 can detect the precursor of the abnormality by which the smooth operation of the transmission mechanism 35 is impaired, by comparing the movement amount of the turning shaft 32 per unit rotation angle of the turning motor 33 and the precursor determination threshold. Further, the precursor detection circuit 73 can detect the abnormality by which the smooth operation of the transmission mechanism 35 is impaired, by comparing the movement amount of the turning shaft 32 per unit rotation angle of the turning motor 33 and an abnormality determination threshold.

Event B2

For example, the event B2 occurs due to end knocking of the turning shaft 32. The end knocking means that an end portion of the turning shaft 32 knocks against the housing 31. The transmission mechanism 35 accumulates damage whenever the end knocking occurs. The transmission mechanism 35 receives a greater damage as the movement speed of the turning shaft 32 is higher. The accumulation of the damage is a cumulative or irreversible event. As for the accumulation of the damage, basically, the condition irreversibly deteriorates, and does not improve. The accumulation of the damage in the transmission mechanism 35 causes the abnormality by which the smooth operation of the transmission mechanism 35 is impaired. Therefore, it can be said that the event B2 is the precursor of the abnormality by which the smooth operation of the transmission mechanism 35 is impaired.

The damage of the transmission mechanism 35 includes tooth abrasion or tooth loss of the belt 54. At the time of the end knocking, the movement of the turning shaft 32 is restricted, and thereby, the rotation of the ball nut 51 and the rotation of the belt 54 are restricted. On the other hand, the turning motor 33 and the driving pulley 52 continue to rotate due to the inertial force. Therefore, there is a risk that tooth skipping occurs in the belt 54. Tooth skipping is a phenomenon in which the teeth of the belt 54 go beyond the teeth of the driving pulley 52 or the teeth of the driven pulley 53. When tooth skipping repeatedly occurs, there is a risk that the abrasion of the teeth of the belt 54 progresses and then the loss of the teeth of the belt 54 occurs.

For example, the precursor detection circuit 73 determines whether the end knocking has occurred, based on the degree of decrease in the change rate of the rotation angular speed of the turning motor 33. The rotation angular speed of the turning motor 33 is a value that reflects the movement speed of the turning shaft 32, and is obtained by differentiating the rotation angle $\theta_b$ of the turning motor 33. The precursor detection circuit 73 computes the damage amount of the transmission mechanism 35. The damage amount is a value that is obtained by quantifying the occurrence status of the end knocking. Whenever it is determined that the end knocking has occurred, the precursor detection circuit 73 computes a count value, and adds the count value to the last value of the damage amount. Thereby, the precursor detection circuit 73 computes the present value of the damage amount. The precursor detection circuit 73 computes the count value such that the count value is larger as the absolute value of the rotation angular acceleration of the turning motor 33 is larger. The precursor detection circuit 73 can detect the precursor of the abnormality by which the smooth operation of the transmission mechanism 35 is impaired, by comparing the damage amount of the transmission mechanism 35 and the precursor determination threshold. Further, the precursor detection circuit 73 can detect the abnormality by which the smooth operation of the transmission mechanism 35 is impaired, by comparing the damage amount of the transmission mechanism 35 and an abnormality determination threshold.

Event B3

For example, the event B3 occurs due to the block of the operation of the ball screw. The ball screw includes the ball screw portion 32a of the turning shaft 32 and the ball nut 51. On the ball screw portion 32a and the ball nut 51, abrasion or rust can be generated by long-term use. The abrasion or rust is a cumulative or irreversible event. As for the abrasion or rust, basically, the condition irreversibly deteriorates, and does not improve. Depending on the degree of the progression of the abrasion or rust, there is a risk that the friction when the ball nut 51 rotates relative to the turning shaft 32 is abnormally increased and thereby the smooth operation of the ball screw is blocked. The load of the turning motor 33 abnormally increases, and therefore, the rising gradient of the torque of the turning motor 33 rapidly increases. Therefore, it can be said that the event B3 is the precursor of the abnormality by which the smooth operation of the transmission mechanism 35 is impaired.

The precursor detection circuit 73 detects a current value $I_b$ of the turning motor 33 through a current sensor 74. The current sensor 74 is provided on an electricity supply path to the turning motor 33 (see FIG. 2). The current value $I_b$ is a value that reflects the torque of the turning motor 33. The precursor detection circuit 73 computes the torque gradient of the turning motor 33. The torque gradient can be regarded as the ratio of the change amount of the current value $I_b$ of the turning motor 33 to the change amount of the turning angle $\theta_w$. The precursor detection circuit 73 computes the torque gradient by dividing the difference between the last value and present value of the current value $I_b$ of the turning motor 33 by the computation period. The precursor detection circuit 73 can detect the precursor of the abnormality by which the smooth operation of the transmission mechanism 35 is impaired, by comparing the torque gradient of the turning motor 33 and the precursor determination threshold. Further, the precursor detection circuit 73 can detect the abnormality by which the smooth operation of the transmission mechanism 35 is impaired, by comparing the torque gradient of the turning motor 33 and an abnormality determination threshold.

First Comparative Example of Precursor Report Pattern

Figure 3:
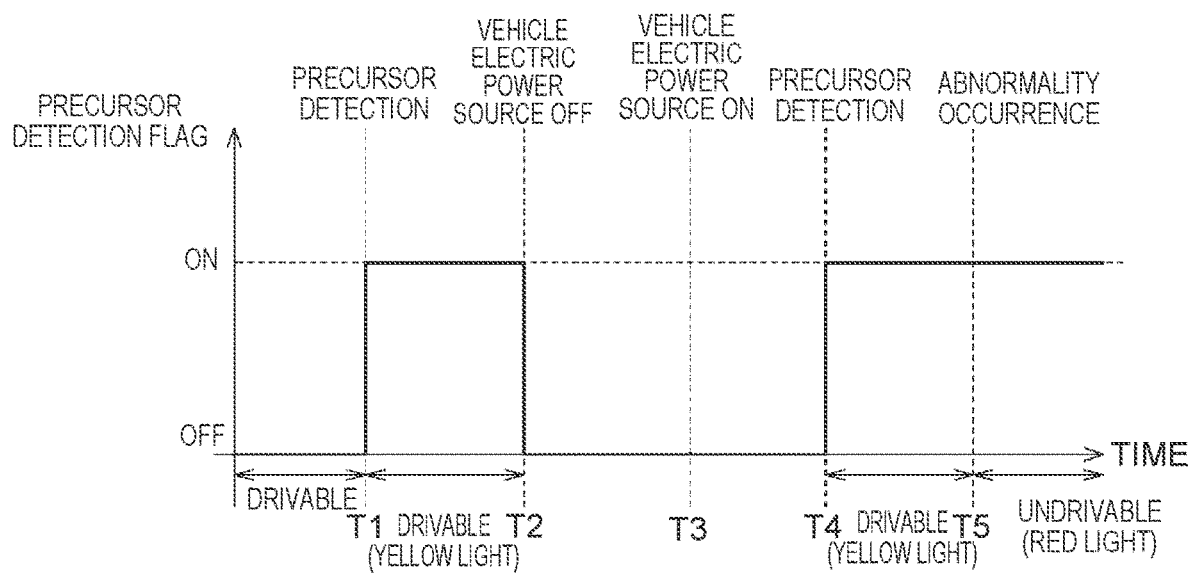
FIG. 3 is a graph showing a first comparative example of a precursor report pattern.

Next, a first comparative example of a precursor report pattern will be described. As shown in the graph of FIG. 3, when the precursor of the abnormality by which the smooth operation of the transmission mechanism 35 is impaired is detected while a vehicle electric power source is in an on-state (time T1), the precursor detection circuit 73 switches a precursor detection flag on. The precursor detection flag indicates whether the precursor has been detected. When the precursor is detected, the precursor detection circuit 73 reports the precursor to the driver through the report device 80. For example, the report device 80 lights the indication lamp in the vehicle cabin in yellow, as the decided report operation. At the time point when the precursor is detected, the vehicle is in the drivable state.

Thereafter, when the vehicle electric power source is switched off (time T2), the precursor detection circuit 73 switches the precursor detection flag off. Further, the precursor detection circuit 73 stops the report operation by the report device 80. When the vehicle electric power source is switched on again (time T3), the precursor is sometimes detected again after a while. For example, when the cause of the precursor is not resolved, the precursor is detected again.

When the precursor is detected again (time T4), the precursor detection circuit 73 switches the precursor detection flag on again. Further, the precursor detection circuit 73 reports the precursor to the driver through the report device 80 again. At the time point when the precursor is detected again, the vehicle is in the drivable state.

Thereafter, since the vehicle continues to be used after the precursor is detected, there is a risk that the abnormality by which the smooth operation of the transmission mechanism 35 is impaired occurs (time T5). When the abnormality by which the smooth operation of the transmission mechanism 35 is impaired is detected, the precursor detection circuit 73 maintains the on-state of the precursor detection flag. Further, when the abnormality by which the smooth operation of the transmission mechanism 35 is impaired is detected, the precursor detection circuit 73 generates the command signal S1 for raising the report level of the report device 80. For example, the report device 80 alters the indication color of the indication lamp from yellow to red. After the abnormality by which the smooth operation of the transmission mechanism 35 is impaired occurs, there is a risk that the vehicle cannot smoothly run.

In this way, even when the detection of the precursor is reported, all drivers do not perform the inspection of the vehicle immediately. A possible reason is shown below, as an example. It is difficult to recognize a period or distance by which the vehicle has run after the precursor is reported. Further, it is not possible to know a period or distance by which the vehicle can run after the precursor is reported. Furthermore, in the steer-by-wire type steering device 10, the steering wheel 11 and the turning shaft 32 are mechanically separated. Therefore, it is hard for the driver to feel the change in the motion characteristic of the transmission mechanism 35 or turning wheels 12 due to the occurrence of the events B1 to B3 each of which is the precursor. Since it is hard for the driver to have a sense of danger, the driver continues to use the vehicle even after the precursor is reported.

Second Comparative Example of Precursor Report Pattern

Figure 4:
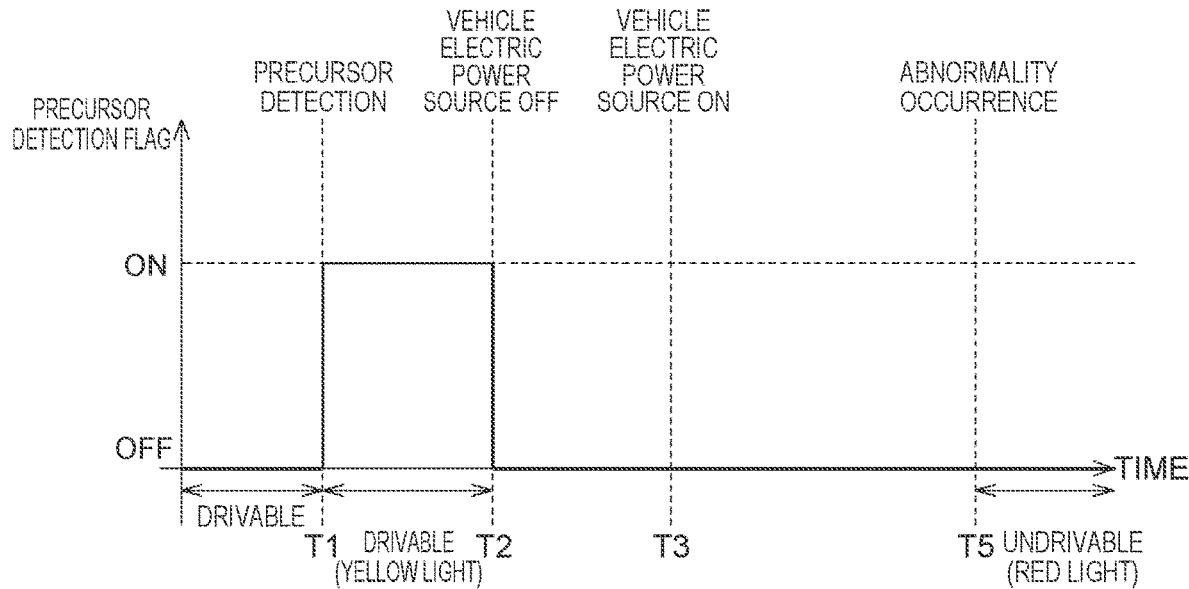
FIG. 4 is a graph showing a second comparative example of the precursor report pattern.

Next, a second comparative example of the precursor report pattern will be described. As shown in the graph of FIG. 4, even when the precursor of the abnormality by which the smooth operation of the transmission mechanism 35 is impaired is detected once (time T1), the precursor is not always detected again, when the vehicle electric power source is switched off (time T2) and then the vehicle electric power source is switched on again (time T3). In the case where the precursor is not detected, the report device 80 does not perform the report operation. Therefore, the vehicle continues to be used without the detection of the precursor, and thereby, there is a risk that the abnormality by which the smooth operation of the transmission mechanism 35 is impaired occurs during the running of the vehicle (time T5).

Configuration of Precursor Detection Circuit

The precursor detection circuit 73 in the embodiment has the following configuration, for appropriately reporting, to the driver, the precursor of the abnormality by which the smooth operation of the transmission mechanism 35 is impaired.

As shown in FIG. 2, the precursor detection circuit 73 includes a counter 73A and a storage circuit 73B. The counter 73A measures a total running time of the vehicle from the time point of the first detection of the precursor. For example, the total running time of the vehicle that is measured by the counter 73A is the total of one of two times (C1) and (C2).

C1. A time during which the vehicle actually runs. For example, whether the vehicle is running can be determined based on the vehicle speed.

C2. A time during which the vehicle electric power source is in the on-state. For example, whether the vehicle electric power source is in the on-state can be determined based on the on-off state of a start-up switch of the vehicle.

The storage circuit 73B has non-volatility. When the vehicle electric power source is switched off, the storage circuit 73B stores the total running time of the vehicle that is measured by the counter 73A. Further, when the vehicle electric power source is switched off, the storage circuit 73B stores the history of the detection of the precursor.

When the vehicle electric power source is switched off, the precursor detection circuit 73 causes the storage circuit 73B to store the total running time of the vehicle that is measured by the counter 73A. When the vehicle electric power source is switched off, the precursor detection circuit 73 causes the storage circuit 73B to store the history of the detection of the precursor.

The precursor detection circuit 73 can alter the report level of the report device 80. For example, the report level includes three report levels (D1), (D2) and (D3).

D1. First report level. The first report level is the lowest level of the three stages.

D2. Second report level. The second report level is the middle level of the three stages.

D3. Third report level. The third report level is the highest level of the three stages.

For example, the report operation of the report device 80 includes five report operations (E1) to (E5).

E1. Lighting of the indication lamp.

E2. Displaying for encouraging the driver to perform the inspection of the vehicle without delay.

E3. Displaying for encouraging the driver to perform the inspection of the vehicle promptly.

E4. Displaying for encouraging the driver to perform the inspection of the vehicle now.

E5. Periodic whistling of the buzzer.

The displaying in the report operations E2, E3 and E4 is performed using the display or a meter panel. The displaying includes a character message and a voice message. The temporal immediacy increases in the order of the report operation E2, the report operation E3 and the report operation E4.

When the report device 80 operates at the first report level D1, the report device 80 performs the report operations E1 and E2. When the report device 80 operates at the second report level D2, the report device 80 performs the report operations E1, E3 and E5. When the report device 80 operates at the third report level D3, the report device 80 performs the report operations E1, E4 and E5.

In the case where the report level of the report device 80 is altered to the third report level, the precursor detection circuit 73 generates a request signal S2 for the vehicle control device 81. The vehicle control device 81 controls a running drive source of the vehicle. The request signal S2 is an electric signal for requesting the vehicle control device 81 to limit the vehicle speed to a decided limiting speed. Based on the request signal S2, the vehicle control device 81 limits the vehicle speed to the limiting speed.

Precursor Report Pattern in Embodiment

Figure 5:
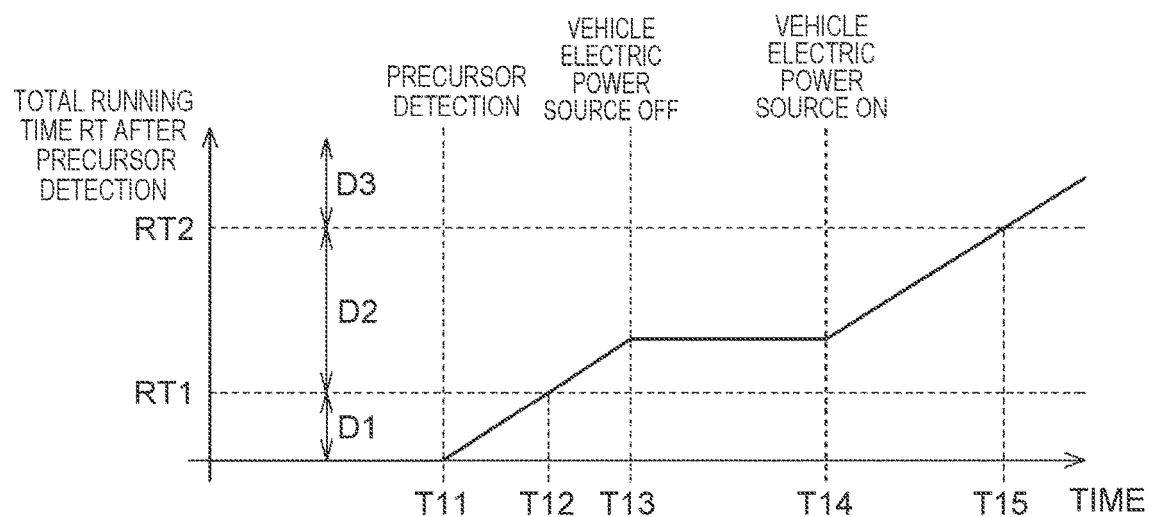
FIG. 5 is a graph showing a precursor report pattern in the first embodiment.

A precursor report pattern in the embodiment will be described below. As shown in the graph of FIG. 5, the precursor detection circuit 73 starts the measurement of a total running time RT of the vehicle, when the precursor of the abnormality by which the smooth operation of the transmission mechanism 35 is impaired is detected (time T11). That is, the precursor detection circuit 73 starts up the counter 73A. When the precursor is detected for the first time, the precursor detection circuit 73 sets the report level of the report device 80 to the first report level D1.

When the total running time RT after the precursor detection that is measured by the counter 73A exceeds a first time determination threshold RT1 (time T12), the precursor detection circuit 73 alters the report level of the report device 80 from the first report level D1 to the second report level D2.

Thereafter, when the vehicle electric power source is switched off (time T13), the precursor detection circuit 73 causes the storage circuit 73B to store the total running time RT after the precursor detection that is measured by the counter 73A. The precursor detection circuit 73 stops the operation of the counter 73A.

Thereafter, when the vehicle electric power source is switched on again (time T14), the precursor detection circuit 73 restarts the measurement of the total running time RT by the counter 73A, in the case where a count restart condition is satisfied. For example, the count restart condition includes two conditions (F1) and (F2) described below.

F1. Total running time RT after precursor detection >0

F2. The precursor was detected before the vehicle electric power source was switched off last time.

When the condition (F1) or the condition (F2) is met, the precursor detection circuit 73 determines that the count restart condition is satisfied. When the count restart condition is satisfied, the precursor detection circuit 73 reads the total running time RT stored in the storage circuit 73B. This total running time RT is the total running time RT stored in the storage circuit 73B at the timing when the vehicle electric power source was switched off last time. The precursor detection circuit 73 sets the total running time RT read from the storage circuit 73B, as the initial value of the counter 73A. Thereafter, the precursor detection circuit 73 restarts the measurement of the total running time RT by the counter 73A, regardless of whether the precursor is detected.

When the total running time RT after the precursor detection that is measured by the counter 73A exceeds a second time determination threshold RT2 (time T15), the precursor detection circuit 73 alters the report level of the report device 80 from the second report level D2 to the third report level D3.

Effects of First Embodiment

The first embodiment exerts the following effects.

(1-1) The precursor detection circuit 73 detects the precursor of the abnormality by which the smooth operation of the turning unit 30 is impaired. The precursor detection circuit 73 starts the measurement of the total running time RT of the vehicle, when the precursor is detected, and executes the process of reporting the precursor, based on the measured total running time RT. When the vehicle electric power source is switched off and then is switched on again after the precursor is detected once, the precursor detection circuit 73 performs the measurement of the total running time RT of the vehicle, regardless of whether the precursor is detected again. That is, when the vehicle electric power source is switched off and then is switched on again after the precursor is detected once, the precursor detection circuit 73 performs the measurement of the total running time RT of the vehicle, even when the precursor is not detected again. Therefore, it is possible to appropriately report the precursor depending on the total running time of the vehicle. Further, it is possible to restrain the vehicle from continuing to be used while the precursor is not detected, for some reason, and further, it is possible to restrain the occurrence of the abnormality by which the smooth operation of the transmission mechanism 35 is impaired during the running of the vehicle.

(1-2) The events B1 to B3 each of which is the precursor of the abnormality occur due to cumulative or irreversible events. The cumulative or irreversible event includes the slack or abrasion of the belt 54, the accumulation of the damage in the transmission mechanism 35 due to the end knocking, and the abrasion or rust of the ball screw portion 32a and the ball nut 51. Because of the precursor that occurs due to the cumulative or irreversible event, it is possible to appropriately detect the precursor based on the total running time RT of the vehicle.

(1-3) When the vehicle electric power source is switched off, the precursor detection circuit 73 stores the total running time RT of the vehicle. Thereafter, when the vehicle electric power source is switched on again, the precursor detection circuit 73 restarts the measurement of the total running time RT, using the total running time RT stored at the timing when the vehicle electric power source is switched off, as the initial value. Therefore, the precursor detection circuit 73 can appropriately report the precursor to the driver, depending on the total running time RT of the vehicle from the time point of the first detection of the precursor of the abnormality by which the smooth operation of the transmission mechanism 35 is impaired.

(1-4) The precursor detection circuit 73 alters the report level of the report device 80, depending on the total running time RT of the vehicle from the time point of the first detection of the precursor of the abnormality by which the smooth operation of the transmission mechanism 35 is impaired. For example, the precursor detection circuit 73 raises the report level of the report device 80 as the total running time RT of the vehicle increases. Therefore, it is possible to more appropriately report, to the driver, the precursor of the abnormality by which the smooth operation of the transmission mechanism 35 is impaired. For example, it is possible to cause the driver to have a sense of danger, depending on the total running time RT of the vehicle. Further, it is possible to encourage the driver to perform the inspection of the vehicle, depending on the total running time RT of the vehicle.

Second Embodiment

Next, a second embodiment of the turning control device will be described. Basically, the embodiment has the same configuration as the first embodiment shown in FIG. 1 and FIG. 2. Therefore, the same members and components as those in the first embodiment are denoted by the same reference characters, and detailed descriptions are omitted.

As shown in FIG. 2, the precursor detection circuit 73 includes a clock 54C. The clock 54C measures date and time. A precursor report pattern in the embodiment will be described below.

As shown in the graph of FIG. 6, the precursor detection circuit 73 starts the measurement of the total running time RT of the vehicle, when the precursor of the abnormality by which the smooth operation of the transmission mechanism 35 is impaired is detected (time T11). When the precursor is detected for the first time, the precursor detection circuit 73 sets the report level of the report device 80 to the first report level D1.

When the total running time RT after the precursor detection that is measured by the counter 73A exceeds the first time determination threshold RT1 (time T12), the precursor detection circuit 73 alters the report level of the report device 80 from the first report level D1 to the second report level D2.

Thereafter, when the vehicle electric power source is switched off (time T13), the precursor detection circuit 73 causes the storage circuit 73B to store the total running time RT after the precursor detection that is measured by the counter 73A. The precursor detection circuit 73 stops the operation of the counter 73A. Further, the precursor detection circuit 73 causes the storage circuit 73B to store a time stamp. The time stamp indicates the date and time when the vehicle electric power source is switched off.

Thereafter, when the vehicle electric power source is switched on again (time T14), the precursor detection circuit 73 restarts the measurement of the total running time RT by the counter 73A, in the case where a count restart condition is satisfied. The count restart condition includes the two conditions (F1) and (F2) described above.

When the count restart condition is satisfied, the precursor detection circuit 73 sets the total running time RT read from the storage circuit 73B, as the initial value of the counter 73A. This total running time RT is the total running time RT stored in the storage circuit 73B at the timing when the vehicle electric power source was switched off last time.

Further, the precursor detection circuit 73 reads the time stamp stored in the storage circuit 73B. This time stamp is the time stamp stored in the storage circuit 73B at the timing when the vehicle electric power source was switched off last time. The precursor detection circuit 73 compares the time stamp read from the storage circuit 73B and the present time stamp.

The precursor detection circuit 73 computes the value of a difference ΔDT between a date and time DT1 indicated by the time stamp read from the storage circuit 73B and a date and time DT2 indicated by the present time stamp, as shown by Expression (G1)

$$\Delta DT = DT2 - DT1 \tag{G1}$$

When the value of the difference ΔDT is equal to or larger than a third time determination threshold DT3 as shown by Expression (G2), the precursor detection circuit 73 corrects the initial value of the counter 73A. For example, the third time determination threshold DT3 is set using, as a standard, a period during which the rust of the transmission mechanism 35 is likely to progress.

$$\Delta DT \geq DT3 \tag{G2}$$

When the value of the difference ΔDT is equal to or larger than the third time determination threshold DT3, the precursor detection circuit 73 adds a decided additional value to the initial value of the counter 73A. At this time, a final initial value $RT_o$ of the counter 73A is expressed by Expression (G3).

$$RT_o = RT_{mem} + RT_{add} \tag{G3}$$

"$RT_{mem}$" is the total running time RT read from the storage circuit 73B, and is the initial value of the counter 73A before the correction. "$RT_{add}$" is the decided additional value. The additional value $RT_{add}$ may be a constant number, or may be a variable number that increases in proportion to the difference ΔDT. Further, the additional value $RT_{add}$ may be the value of the difference ΔDT.

When the difference ΔDT between the date and time DT1 indicated by the time stamp read from the storage circuit 73B and the date and time DT2 indicated by the present time stamp is smaller than the third time determination threshold DT3 as shown by Expression (G4), the precursor detection circuit 73 does not correct the initial value of the counter 73A.

$$\Delta DT < DT3 \tag{G4}$$

At this time, the final initial value $RT_o$ of the counter 73A is expressed by Expression (G5). The total running time RT read from the storage circuit 73B when the vehicle electric power source is switched on again is adopted as the final initial value $RT_o$ of the counter 73A, with no change.

$$RT_o = RT_{mem} \tag{G5}$$

After the precursor detection circuit 73 decides the final initial value $RT_o$ of the counter 73A, the precursor detection circuit 73 restarts the measurement of the total running time RT by the counter 73A, regardless of whether the precursor is detected.

When the total running time RT after the precursor detection that is measured by the counter 73A exceeds the second time determination threshold RT2 (time T15), the precursor detection circuit 73 alters the report level of the report device 80 from the second report level D2 to the third report level D3.

In the case where the initial value of the counter 73A is corrected, the final initial value $RT_o$ of the counter 73A can be exceeding the second time determination threshold RT2. In this case, the report level of the report device 80 is altered from the second report level D2 to the third report level D3 immediately after the restart of the measurement of the total running time RT.

Effects of Second Embodiment

The second embodiment exerts the following effect, in addition to the above effects in the sections (1-1) to (1-4) in the first embodiment.

(2-1) In the case where the vehicle electric power source is in the off-state for a long period, there is a risk that the condition of the transmission mechanism 35 deteriorates in the period during which the vehicle electric power source is in the off-state. For example, in the case where the above event B3 has been detected due to the rust of the transmission mechanism 35 before the vehicle electric power source is switched off, the rust can progress in the period during which the vehicle electric power source is in the off-state. In consideration of this, the precursor detection circuit 73 increases the initial value $RT_o$ of the counter 73A, depending on the period during which the vehicle electric power source is in the off-state. Therefore, it is possible to more quickly report the precursor in consideration of the deterioration in the condition of the transmission mechanism 35 in the period during which the vehicle electric power source is in the off-state.

Other Embodiments

The first and second embodiments may be carried out while being modified as described below.

Depending on the product specification, the turning control device 50 may compute the target rotation angle of the turning motor 33, based on a target turning angle computed by a high-order control device that is mounted on the vehicle.

The report level of the report device 80 is not limited to three stages. The report level may be constituted by two stages, or may be constituted by four or more stages. The report operation for each report level may be appropriately modified depending on the product specification and the like. Further, the report level of the report device 80 may be constituted by one stage. Even in this case, it is possible to obtain the effects described in the above sections (1-1), (1-2), (1-3) and (2-1).

For example, the transmission mechanism 35 may include a worm reducer and a rack-and-pinion mechanism, instead of the belt transmission mechanism and the ball screw mechanism.

Without being limited to precursors of mechanical abnormalities in the transmission mechanism 35 and the like, the turning control device 50 may report precursors of electric abnormalities in electric circuits for operating the turning motor 33, and the like. For example, the turning motor 33 may include windings for two systems. The turning control device 50 includes a first system circuit and a second system circuit. Each system circuit is an electric circuit for operating the turning motor 33, and includes a control circuit and a motor drive circuit. The turning control device 50 has a coordinated drive mode and a single-system drive mode, as the drive mode of the turning motor 33. The coordinated drive mode is a normal drive mode in which each system circuit properly operates. The single-system drive mode is a drive mode in which the abnormality of the first system circuit or the second system circuit is fixed and there is no possibility of the return to the proper operation. For example, when the abnormality of the first system circuit is fixed, only the second system circuit causes the turning motor 33 to generate torque. On the premise of this configuration, the turning control device 50 starts the measurement of the total running time RT of the vehicle, when the drive mode of the turning motor 33 transitions from the coordinated drive mode to the single-system drive mode. Depending on the total running time RT of the vehicle, the turning control device 50 reports the single-system drive mode, as the precursor of the abnormality by which the operation of the turning motor 33 is impaired.

The steering device 10 may include a clutch. In this case, the steering shaft 21 is coupled with the pinion shaft 61 through the clutch. For example, the clutch is an electromagnetic clutch that performs the connection or disconnection of dynamic force by the connection or disconnection of the energization of an exciting coil.

The steering device 10 may be an electronic power steering device. For example, the electronic power steering device gives an assist force to the turning shaft 32. The assist force is a force for assisting the steering of the steering wheel 11. The steering shaft 21 is coupled with the pinion shaft 61 in an integrally rotatable manner.

What is claimed is:

1. A turning control device that controls a turning device, the turning device turning a turning wheel of a vehicle, the turning control device comprising a precursor detection circuit configured to detect a precursor of an abnormality by which a smooth operation of the turning device is impaired, wherein:
   the precursor detection circuit is configured to start measurement of a total running time of the vehicle when the precursor is detected, and is configured to execute a process of reporting the precursor, based on the measured total running time; and
   the precursor detection circuit is configured to perform the measurement of the total running time regardless of whether the precursor is detected again, when a vehicle electric power source is switched off and then is switched on again after the precursor is detected once, wherein:
   the precursor detection circuit is configured to store the total running time when the vehicle electric power source is switched off;
   the precursor detection circuit is configured to read the total running time stored at a timing when the vehicle electric power source is switched off, when the vehicle electric power source is switched on again, and is configured to restart the measurement of the total running time, using the read total running time as an initial value, and
   the precursor detection circuit is configured to increase the initial value depending on a period during which the vehicle electric power source is in an off-state.

2. The turning control device according to claim 1, wherein the precursor is a precursor that occurs due to a cumulative or irreversible event.

3. The turning control device according to claim 1, wherein:
   the turning device includes a turning shaft that turns the turning wheel, a turning motor that generates dynamic force for turning the turning wheel, and a transmission mechanism that transmits the dynamic force of the turning motor to the turning shaft;
   the abnormality includes rust of the transmission mechanism; and
   the precursor detection circuit is configured to increase the initial value when the period during which the vehicle electric power source is in the off-state is longer than a time determination threshold, the time determination threshold being set using, as a standard, a period during which the rust of the transmission mechanism is likely to progress.

4. The turning control device according to claim 1, wherein the precursor detection circuit is configured to raise a report level for the precursor depending on the total running time from a time point of a first detection of the precursor.

* * * * *